(12) United States Patent
Lee et al.

(10) Patent No.: US 7,871,514 B2
(45) Date of Patent: Jan. 18, 2011

(54) EXTRACTIVE DISTILLATION PROCESSES USING WATER-SOLUBLE EXTRACTIVE SOLVENTS

(75) Inventors: Fu-Ming Lee, Katy, TX (US); Tzong-Bin Lin, Chiayi (TW); Jyh-Haur Hwang, Dali (TW); Hung-Chung Shen, Chiayi (TW); Kuang-Yeu Wu, Plano, TX (US); Tsung-Min Chiu, Jhonghe (TW); Zong-Ying Chen, Kaohsiung (TW); Tung-Hsiung Kuo, Tainan (TW); Yu-Ming Wu, Guanmiao Township (TW)

(73) Assignees: CPC Corporation, Taiwan, Taipei (TW); AMT International Inc., Plano, TX (US)

( * ) Notice: Subject to any disclaimer, the term of this patent is extended or adjusted under 35 U.S.C. 154(b) by 244 days.

(21) Appl. No.: 12/316,405

(22) Filed: Dec. 12, 2008

(65) Prior Publication Data
US 2009/0105514 A1  Apr. 23, 2009

Related U.S. Application Data

(63) Continuation-in-part of application No. 11/837,459, filed on Aug. 10, 2007, now Pat. No. 7,666,299.

(51) Int. Cl.
*C07C 7/00* (2006.01)
(52) U.S. Cl. .......... 208/313; 208/321; 208/325; 208/326; 208/330; 208/331; 208/333; 208/334
(58) Field of Classification Search .......... 208/313, 208/320–339
See application file for complete search history.

(56) References Cited

U.S. PATENT DOCUMENTS

| | | | |
|---|---|---|---|
| 4,559,109 A | 12/1985 | Lee | |
| 4,654,123 A | 3/1987 | Berg | |
| 5,035,776 A | 7/1991 | Knapp | |
| 5,877,385 A * | 3/1999 | Lee et al. | 585/807 |

FOREIGN PATENT DOCUMENTS

JP  02-184643 A  7/1990

OTHER PUBLICATIONS

Korean IP Office, Written Opinion and Int'l Search Report for PCT/US2008/013676, Aug. 4, 2009.

* cited by examiner

*Primary Examiner*—Robert J Hill, Jr.
*Assistant Examiner*—Brian McCaig
(74) *Attorney, Agent, or Firm*—Cascio & Zervas

(57) ABSTRACT

Extractive distillation processes whereby water-soluble extractive distillation (ED) solvents are regenerated and recovered employ improved operations of the extractive distillation column (EDC) so that polar hydrocarbons are recovered and purified from mixtures containing polar and less polar hydrocarbons and measurable amounts of hydrocarbons that are heavier than intended feedstock and/or polymers that are generated in the ED process. The improved process can effectively remove and recover the heavy hydrocarbons and/or remove polymer contaminants from the solvent in a closed solvent circulating loop through mild operating conditions with no additional process energy being expended. With the improved process, the overhead reflux of the EDC may be eliminated to further reduce energy consumption and to enhance the loading and performance within the upper portion of the EDC, especially when two liquid phases exists therein.

30 Claims, 6 Drawing Sheets

EXTRACTIVE DISTILLATION PROCESSES USING WATER-SOLUBLE EXTRACTIVE SOLVENTS

REFERENCE TO RELATED APPLICATIONS

This is a continuation-in-part application of U.S. patent application Ser. No. 11/837459, now U.S. Pat. No. 7,666,299, which was filed on Aug. 10, 2007.

FIELD OF THE INVENTION

The present invention relates generally to extractive distillation processes whereby water-soluble extractive distillation (ED) solvents are efficiently regenerated and recovered and more particularly to improved operations of the extractive distillation column (EDC) so that polar hydrocarbons are effectively recovered and purified from mixtures containing polar and less polar hydrocarbons, and measurable amounts of hydrocarbons that are heavier than intended feedstock, and/or polymers that are generated in the ED process. The improved process removes the heavy hydrocarbons and polymers from the solvent that is in a closed solvent circulating loop under mild operating conditions.

BACKGROUND OF INVENTION

In extractive distillation, a nonvolatile polar solvent is added to the EDC to increase the relative volatility between the polar and less-polar components that have close-boiling points. Typically, the solvent is added to the upper portion of the EDC and the hydrocarbon feed is introduced into the middle portion of the EDC. As the nonvolatile solvent descends through the column, it preferentially extracts the polar components to form a rich solvent that moves toward the bottom of the EDC and allows the less-polar component vapors to ascend to the top of the column. The overhead vapor is condensed and a portion of the condensate is recycled to the top of the EDC as reflux while the remaining portion is withdrawn as raffinate product. The rich solvent stream containing the solvent and the polar components is fed to a solvent recovery column (SRC) to recover the polar components as an overhead product and the lean solvent (free of the feed components) as a bottom product, which is recycled to the upper portion of the EDC to be reused as extractive solvent. A portion of the overhead product is recycled to the top of the SRC as the reflux to knock down any entrained solvent in the overhead vapor. The SRC is optionally operated under reduced pressure (vacuum) and/or with a stripping medium to reduce the column bottom temperature.

ED processes to separate aromatic and non-aromatic components are described in U.S. Pat. No. 7,078,580 to Tian, et al., U.S. Pat. No. 4,053,369 to Cines, and F. Lee, et al., "Two Liquid-Phase Extractive Distillation for Aromatics Recovery", Ind. Eng. Chem. Res. (26) No. 3, 564-573, 1987. ED techniques to separate diolefin and olefin components are described in U.S. Pat. No. 4,269,668 to Patel and to separate cycloparaffins and paraffins are described in R. Brown, et al., "Way To Purify Cyclohexane", Hydrocarbon Processing, 83-86, May 1991. Finally, ED processes to separate styrene and $C_8$ aromatics are describes in U.S. Pat. No. 5,849,982 to Lee, et al.

Recovering aromatic hydrocarbons from mixtures containing aromatic and non-aromatic hydrocarbons can be achieved through liquid-liquid extraction (LLE) or ED. ED processes require less equipment than LLE processes, for example, ED typically requires two separation columns as compared to four for LLE. Moreover, ED requires less energy and encounters fewer operational problems; however, application of the ED process is constrained by the boiling range of the feedstock. Thus, in order for the ED process to achieve acceptable levels of aromatic purity and recovery, the solvent must retain essentially all the benzene, which is the lightest aromatic compound with a boiling point (BP) of 80.1° C., in the EDC bottom; in addition, the process must drive virtually all of the heaviest non-aromatics into the overhead of the EDC. For a narrow boiling-range ($C_6$-$C_7$) aromatic feedstock, the heaviest non-aromatic compound can be ethylcyclopentane (BP: 103.5° C.) whereas for the full boiling-range ($C_6$-$C_8$) aromatic feedstock, the heaviest non-aromatic compound can be ethylcyclohexane (BP: 131.8° C.). As is apparent, it is much more difficult to recover benzene, toluene, and xylene (BTX) aromatics from a full boiling-range feedstock, such as a full range pyrolysis gasoline, than it is to recover benzene and toluene from a narrow boiling-range feedstock, such as $C_6$-$C_7$ reformate. An ED process, that is suitable for the narrow boiling-range aromatic feedstock, may not be able to satisfactorily process the full boiling-range aromatic feedstock.

Another critical problem associated with the ED process for aromatics recovery is the existence of measurable amounts of heavy ($C_9$-$C_{12}$) hydrocarbons in the ED feedstock, which in severe situations may cause the process to fail. This problem is of special concern in the recovering of BTX aromatics from the full boiling-range ($C_6$-$C_8$) feedstock. For aromatics recovery in ED and LLE processes, the solvent is circulated indefinitely in a closed loop configuration. To remove the heavy hydrocarbons and the polymerized heavy materials derivates from oxidized solvent, commercial LLE processes use a solvent regenerator whereby a small slip stream of the lean solvent (approximately 1% of the lean solvent stream) is heated with or without stripping steam to recover regenerated solvent and/or any heavy components having boiling points lower than that of the solvent. The heavy polymeric materials having boiling points higher than that of the solvent are removed from the bottom of the solvent regenerator as sludge.

The solvent regeneration scheme disclosed in U.S. Pat. No. 4,048,062 to Asselin was successfully implemented in UOP and IFP LLE aromatics recovery processes using sulfolane and water as the extractive solvent. The reason for the success was that most of the heavy ($C_9$ to $C_{12}$) hydrocarbons in the feedstock were rejected by the solvent phase in the LLE column and were removed along with the raffinate phase as part of the non-aromatic product. Only a portion of $C_9$ aromatic compounds were subject to extraction by the solvent and they can be effectively stripped from the solvent in the SRC under normal operating conditions.

In normal EDC operations for aromatics recovery, however, these heavy hydrocarbons tend to remain in the rich solvent at the bottom of the EDC due to their high boiling points. For the full boiling-range ($C_6$-$C_8$) feed, the high boiling points of the heavy hydrocarbons prevent them from being stripped from the solvent in the SRC so these heavy hydrocarbons accumulate as the solvent is circulated indefinitely in a closed loop between the EDC and the SRC. The solvent regeneration scheme that is described in U.S. Pat. No. 4,048,062 is not applicable for ED process since it is designed for LLE processes for removing minor amounts of polymeric materials that are formed possibly from reactions between the oxidized or decomposed solvent components and traces of heavy hydrocarbons in the solvent. The industry is in need of methods to adequately remove heavy hydrocarbons and/or polymers from the lean solvent of the ED process for recovering aromatics.

$C_4$ hydrocarbons mixtures containing $C_4$ of different degrees of unsaturation, such as mixtures of butanes and butenes and mixtures of 1,3 butadiene with butanes and butenes, are not easily separated by ordinary fractional distillation because of the similarities in boiling points of the constituents and the formation of azeotropes. However, these mixtures are much more efficiently separated into their individual components by an ED process using a water-soluble solvent of relatively higher boiling point which selectively dissolves one or more of the more-unsaturated components. The commercially practiced solvents include furfural, acetonitrile, dimethyl formamide, dimethyl acetamide, and N-methylpyrrolidone, 3-methoxy propionitrile, and their mixtures with water. U.S. Pat. Nos. 3,309,412 and 3,551,507 both to Sakuragi et al. recognized the polymerization of butadiene in the ED process and taught adding minor amounts of inhibitors, such as furfural, benzaldehyde, nitrophenol, or dinitrophenol, to the solvents in order to minimize this problem. The inhibitors reduce the level of polymerization but accumulated polymers must still be removed from the lean solvent.

U.S. Pat. No. 5,849,982 to Lee et al. disclosed an ED process, for recovering styrene from the $C_8$ fraction of pyrolysis gasoline, which uses water-soluble solvents including propylene carbonate, sulfolane, methyl carbitoal, 1-methyl-2-pyrrolidone, 2-pyrrolidone and their mixtures with water. No polymer inhibitor was added in this process even though styrene has a tendency to form polymers under thermal conditions. The lean solvent was regenerated with a conventional solvent regenerator using energy derived from steam stripping and reboiler heat. The ED process might not remove all the generated polymers.

Current extractive solvents for liquid-liquid extraction or extractive distillation are water-soluble, especially sulfolane, polyalkylene glycols, N-substituted morpholine, furfural, acetonitrile, dimethyl formamide, dimethyl acetamide, N-methylpyrrolidone, and 3-methoxy propionitrile. Indeed, because they are water-soluble, extractive solvent can be removed in minor amounts from the raffinate stream generated in the extraction zone of the LLE process, through counter-current or co-current extraction with water, to produce a solvent-free raffinate product stream. The solvent may be present in the raffinate stream partly as an equilibrium constituent in low concentrations and partly as an entrained dispersion of free solvent phase due to the turbulence within the extraction zone. Aromatic purification via LLE processes is further described in U.S. Pat. No. 4,419,226 to Asselin wherein the solvent composition comprises sulfolane and water and in U.S. Pat. No. 2,773,918 to Stephens wherein the solvent comprises polyalkylene glycol and water. Both techniques include the step of extracting a water-soluble solvent with water from a non-aromatic raffinate stream exiting the extraction zone of the LLE process. The water-soluble property of the solvent can also be used to maintain the concentration of the co-solvent in the solvent mixture as disclosed in U.S. Pat. No. 6,551,502 to Lee, et al.

In an ordinary distillation column, the overhead liquid reflux is essential to generate the liquid phase, in the rectifying section of the column, which contacts the uprising vapor phase from tray-to-tray for separating the key components in the feed mixture. Depending on the application, the normal reflux-to-distillate ratio in a distillation column is approximately 1 to 20. In the EDC, however, the liquid phase in the rectifying section is the nonvolatile, polar solvent, which preferentially absorbs the more-polar components from the uprising vapor phase and allows the less-polar component vapors to ascend to the top of the EDC. The present invention recognizes that adding reflux to the EDC may not significantly enhance purity and recovery of the EDC overhead product (the raffinate). Its sole purpose is to knock down the entrained solvent in the raffinate product. In fact, elimination of the EDC reflux can substantially reduce the steam consumption in the bottom reboiler and reduce the vapor loading of the upper portion of the column, thereby, increasing the column throughput.

Finally, two liquid phases may occur in the EDC if the extractive solvent has very limited solubility of the less polar components in the feed mixture. For example, an ED process for purifying the aromatics using sulfolane containing water as the solvent was disclosed by U.S. Pat. No. 4,053,369 to Cines, where two liquid phases existed in the upper portion of the EDC. This is due to the fact that sulfolane has very limited solubility with the less polar non-aromatics, which are concentrated in the upper part of the EDC. However, contrary to Cines' teaching, the present invention further recognizes that the existence of two liquid phases in an EDC is quite undesirable and may create many potential operating problems in the EDC. Limited experimental data available in the literature suggest that the column (or tray) efficiencies are quite low and highly variable in the range of 25 to 50% in the two-liquid phase region. Adding reflux to the EDC causes expansion of the two-liquid phase region in the upper portion of the EDC since the reflux is essentially 100% raffinate, which is less soluble in the solvent. Without EDC reflux, different methods must be developed to eliminate the entrained solvent in the raffinate product from the EDC overhead stream.

SUMMARY OF THE INVENTION

The present invention is directed to extractive distillation processes that incorporate an improved lean solvent regeneration system that significantly reduces the amount of heavy hydrocarbons and/or polymers that are otherwise strapped in the closed solvent loop. The benefits include superior solvent performance, reduction in the amount of solvent that is regenerated per cycle, and, when necessary, recovery of the value of the heavy hydrocarbons. The invention is based in part on the recognition that these advantages can be achieved by replacing the typical high temperature, energy intensive, and difficult-to-operate lean solvent regenerator in prior art extractive distillation systems with a low temperature, energy saving and easy-to-operate water-wash system. The original lean solvent regenerator can optionally be retained but operated at a substantially reduced capacity as an auxiliary unit to the new water-wash system.

In one aspect, the invention is directed to an extractive distillation process, whereby a polar hydrocarbon selective, water-soluble solvent is recovered from a solvent-rich stream containing the selective solvent and measurable amounts of heavy hydrocarbons and sludge, which includes the steps of:

(a) introducing a feed containing a polar hydrocarbon and a less polar hydrocarbon into a middle portion of an extractive distillation column (EDC) and introducing a selective solvent feed stream into an upper portion of the EDC;

(b) recovering a water-containing, less polar hydrocarbon-rich stream from the top of the EDC and withdrawing a first solvent-rich stream containing water-soluble solvent and polar hydrocarbon from the bottom of the EDC;

(c) introducing the first solvent-rich stream into a middle portion of a solvent recovery column (SRC) and recovering a polar hydrocarbon-rich stream, that is substantially free of water-soluble solvent and less polar hydrocarbon, from the top of SRC, and removing a second solvent-rich stream from the bottom of the SRC;

(d) introducing a greater portion of the second solvent-rich stream into the upper portion of the EDC in step (a) as the selective solvent feed stream and introducing a minor portion of the second solvent-rich stream into a heavy hydrocarbon removal zone;

(e) separating a first water stream from the water-containing less polar hydrocarbon-rich stream that is recovered from the top of the EDC in step (b) and separating a second water stream from the polar hydrocarbon-rich stream that is recovered from the top of the SRC in step (c);

(f) introducing at least a portion of the first stream of water and at least a portion of the second stream of water into the heavy hydrocarbon removal zone and recovering water-soluble solvent in an aqueous phase and rejecting heavy hydrocarbons into an oil phase;

(g) withdrawing an accumulated oil phase containing the heavy hydrocarbons from the heavy hydrocarbon removal zone and recovering an aqueous phase containing the water-soluble solvent from the heavy hydrocarbon removal zone;

(h) separating water from the water-containing less polar hydrocarbon-rich stream in step (b) to generate a less polar hydrocarbon-rich stream that is introduced into a solvent removal zone and introducing a portion of the first stream of water, or a portion of the second stream of water, or a portion of both the first and second streams of water from step (e) into a solvent removal zone thereby extracting entrained water-soluble solvent and rejecting the less polar hydrocarbons;

(i) withdrawing an accumulated oil phase containing the less polar hydrocarbons from the solvent removal zone and recovering an aqueous phase containing water-soluble solvent from the solvent removal zone;

(j) removing tramp iron and polymeric sludge from the aqueous phase from step (g) to yield a solids-free aqueous phase; and (k) introducing the aqueous phase from step (h) and the solids-free aqueous phase from step (j) into a steam generator and vaporizing water to form stripping steam which is introduced into the lower portion of the SRC in step (c).

In another aspect, the invention is directed to an extractive distillation process, whereby a polar hydrocarbon selective, water-soluble solvent is recovered from a solvent-rich stream containing the selective solvent and measurable amounts of heavy hydrocarbons and sludge, which includes the steps of:

(a) introducing a feed containing a polar hydrocarbon and a less polar hydrocarbon into a middle portion of an extractive distillation column (EDC) and introducing a selective solvent feed stream into an upper portion of the EDC;

(b) recovering a water-containing, less polar hydrocarbon-rich stream from the top of the EDC and withdrawing a first solvent-rich stream containing water-soluble solvent and polar hydrocarbon from the bottom of the EDC;

(c) introducing the first solvent-rich stream into a middle portion of a solvent recovery column (SRC) and recovering a polar hydrocarbon-rich stream, that is substantially free of water-soluble solvent and less polar hydrocarbon, from the top of SRC, and removing a second solvent-rich stream from the bottom of the SRC;

(d) introducing a greater portion of the second solvent-rich stream into the upper portion of the EDC in step (a) as the selective solvent feed stream and introducing a minor portion of the second solvent-rich stream into a heavy hydrocarbon removal zone;

(e) separating a first water stream from the water-containing less polar hydrocarbon-rich stream that is recovered from the top of the EDC in step (b) and separating a second water stream from the polar hydrocarbon-rich stream that is recovered from the top of the SRC in step (c);

(f) introducing at least a portion of the first stream of water and at least a portion of the second stream of water into the heavy hydrocarbon removal zone and recovering water-soluble solvent in an aqueous phase and rejecting heavy hydrocarbons into an oil phase;

(g) withdrawing an accumulated oil phase containing the heavy hydrocarbons from the heavy hydrocarbon removal zone and recovering an aqueous phase containing the water-soluble solvent from the heavy hydrocarbon removal zone;

(h) recycling at least a portion of the less polar hydrocarbon-rich stream that is separated from the first water stream in step (e) into the top of the EDC to knock down the entrained water-soluble solvent in the EDC overhead vapor producing a less polar hydrocarbon-rich stream substantially free of said water-soluble solvent;

(j) removing tramp iron and polymeric sludge from the aqueous phase from step (g) to yield a solids-free aqueous phase; and (k) introducing the solids-free aqueous phase from step (O) into a steam generator and vaporizing water to form stripping steam which is introduced into the lower portion of the SRC in step (c).

In a further aspect, the invention is directed to an extractive distillation process, whereby a polar hydrocarbon selective, water-soluble solvent is recovered from a solvent-rich stream containing the selective solvent and measurable amounts of heavy hydrocarbons and sludge, which includes the steps of:

(a) introducing a feed containing a polar hydrocarbon and a less polar hydrocarbon into a middle portion of an extractive distillation column (EDC) and introducing a selective solvent feed stream into an upper portion of the EDC;

(b) recovering a water-containing, less polar hydrocarbon-rich stream from the top of the EDC and withdrawing a first solvent-rich stream containing water-soluble solvent and polar hydrocarbon from the bottom of the EDC;

(c) introducing the first solvent-rich stream into a middle portion of a solvent recovery column (SRC) and recovering a polar hydrocarbon-rich stream, that is substantially free of water-soluble solvent and less polar hydrocarbon, from the top of SRC, and removing a second solvent-rich stream from the bottom of the SRC;

(d) introducing a greater portion of the second solvent-rich stream into the upper portion of the EDC in step (a) as the selective solvent feed stream and introducing a minor portion of the second solvent-rich stream into a lower portion of a water-wash zone;

(e) separating water from the water-containing less polar hydrocarbon-rich stream that is recovered from the top of the EDC in step (b) to yield a first water stream and a less polar hydrocarbon-rich stream which is introduced into the water-wash zone at an entry point below that of the second solvent-rich stream;

(f) separating a first water stream from the water-containing, less polar hydrocarbon-rich stream that is removed in step (b) and separating a second water stream from the polar-hydrocarbon rich stream that is recovered from the top of the SRC in step (c);

(g) introducing at least a portion of the first stream of water and the second stream of water into an upper portion of the water-wash zone and recovering water-soluble solvent in an aqueous phase and rejecting less-polar hydrocarbons and heavy hydrocarbons into an oil phase;

(h) withdrawing an accumulated oil phase containing the less polar hydrocarbons and the heavy hydrocarbons from an upper portion of the water-wash zone and withdrawing an aqueous phase containing water-soluble solvent and any sludge from the bottom of the water-wash zone;

(i) removing tramp iron and polymeric sludge from the aqueous phase in step (h) to yield a solids-free aqueous phase; and (j) introducing the solids-free aqueous phase from step (i) into a steam generator and vaporizing water to form stripping steam which is introduced into the lower portion of the SRC in step (c).

A feature of the inventive process is that eliminating the overhead liquid reflux of the EDC will significantly enhance the extractive distillation process with the following unexpected benefits: (1) reduction in steam consumption, (2) reduction in vapor loading in the upper portion of the EDC to generate more throughput, (3) enhanced solvent performance in the upper portion of the EDC by minimizing the two-liquid phase region, if present, and (4) improved tray efficiency in the upper portion of the EDC by minimizing the two-liquid phase region, if present. A corollary of minimizing the two-liquid phase region is that the extractive distillation experiences less erratic behavior in the upper portion of the EDC when operating parameters are changed.

DETAILED DESCRIPTION OF THE PREFERRED EMBODIMENTS OF THE INVENTION

Figure 1:
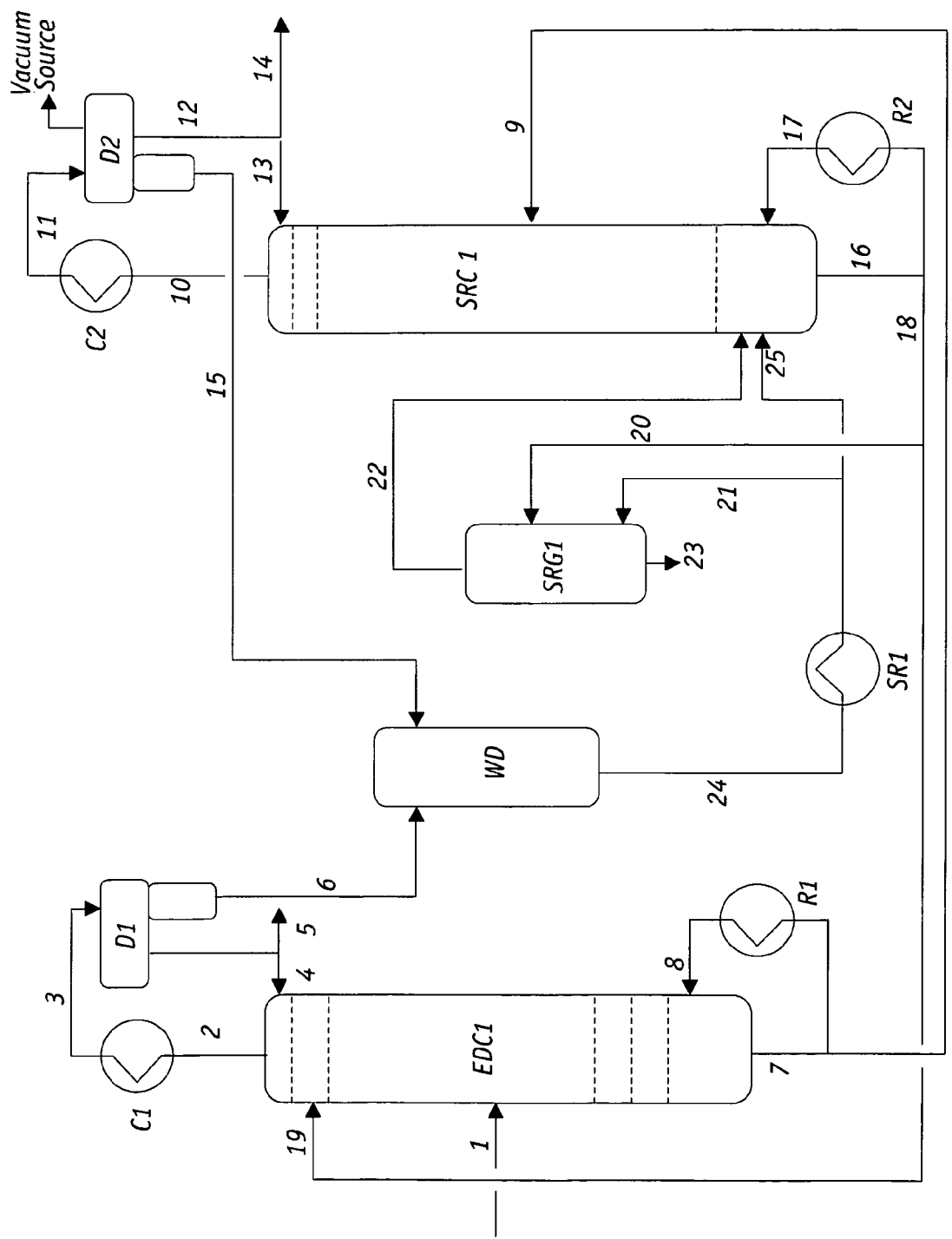
FIG. 1 is a schematic flow diagram of an extractive distillation process that uses a conventional thermal solvent regenerator (the base case)

The present invention is directed to extractive distillation processes for separating and recovering polar hydrocarbons from less-polar hydrocarbons as well as removing heavy hydrocarbons and/or polymer contaminants. The separation is effected through the use of water-soluble extractive distillation solvents that are characteristically selective for absorbing the polar hydrocarbons. Use of the terms "polar" and "less polar" is intended to distinguish between classes of hydrocarbons wherein one particular type is more polar than the other. The invention is particularly suited for applications where the feedstock composition contains mixtures of polar and less polar hydrocarbons. These mixtures include: (1) aromatics and non-aromatics, (2) diolefins and olefins, (3) naphthenes and paraffins, or (4) styrene and $C_8$ aromatics. Exemplary water-soluble solvents can be selected from sulfolane, polyalkylene glycols, N-substituted morpholine, furfural, acetonitrile, dimethyl formamide, dimethyl acetamide, N-methylpyrrolidone, 3-methoxy propionitrile, and mixtures thereof. Preferably water is added as a cosolvent. The choice of water-soluble solvent to be used depends on, among other things, the feedstock composition and the by-products desired. Aqueous sulfolane or aqueous N-formyl morpholine is a particularly suited solvent when the feed comprises aromatics and non-aromatics. Aqueous dimethyl formamide is particularly suited when the feed comprises butadiene and $C_4$ olefins and aqueous sulfolane is particularly suited when the feed comprises styrene and $C_8$ aromatics.

During operation of an extractive distillation column (EDC), the liquid phase in the rectifying section consists of the nonvolatile solvent, which preferentially absorbs the polar components from the uprising vapor phase and allows the less-polar component vapor to ascend to the top of the EDC. It has been demonstrated with a three-meter diameter EDC that was used for BTX aromatics recovery that adding reflux to the EDC does not enhance the purity or recovery of the EDC overhead product, that is, the non-aromatic raffinate. This feature was confirmed by operation of a one-meter diameter EDC for the recovery of anhydrous ethanol from a fermentation broth, where it was observed that the purity and recovery of the anhydrous ethanol were the same regardless of whether EDC reflux was employed or not. In either case, the sole purpose of the reflux was to knock down the entrained solvent from the EDC overhead product. Thus, it is expected that elimination of the EDC reflux will substantially reduce the steam consumption in the bottom reboiler and reduce the vapor loading in the upper portion of the column, thereby, increasing the column throughput.

Two liquid phases may develop in an EDC, especially in the upper portion of the column, if the extractive solvent has very limited solubility for the less polar components in the feed mixture. In this scenario, incorporating reflux into the EDC will cause the two-liquid phase region in the upper portion to expand since the reflux consists essentially of the less soluble raffinate. The presence of a second liquid phase can alter the mass transfer efficiency in the EDC as well as affect the solvent performance which influences the separation factor between the polar and less-polar components. For example, sulfolane solvent uses water as the co-solvent to improve its selectivity in aromatics and non-aromatics separation. Since water has a relatively lower boiling point (high volatility), the sulfolane solvent in upper portion of the EDC has the highest water content. However, data in the literature suggest that, in the two-liquid phase region, the presence of water in sulfolane is actually detrimental to the separation. (See, for example, Lee, et al, "Extractive Distillation Under Two Liquid Phases," 1987 AIChE Summer National Meeting, Minneapolis, Minn.). Lee shows the adverse effects of water on the sulfolane solvent in two liquid phase region, the following data are extracted from this article:

TABLE 1

Effect of water (the co-solvent) on the selectivity of sulfolane under two liquid phases
Pressure: 75.0 cm Hg (absolute)
Overall liquid composition: 50 wt % n-heptane and 50 wt % toluene
Data from one-stage equilibrium cell

| S/F | Temp (° C.) | Water in solvent (wt %) | Vapor composition (wt %) | | R | No. liquid Phase |
|---|---|---|---|---|---|---|
| | | | Heptane | Toluene | | |
| 2.0 | 102 | 0.0 | 70.67 | 29.33 | 2.63 | 2 |
| 2.0 | 98 | 1.0 | 66.94 | 33.06 | 2.01 | 2 |
| 3.0 | 105 | 0.0 | 77.92 | 22.08 | 3.47 | 2 |
| 3.0 | 102 | 1.0 | 73.39 | 26.61 | 2.71 | 2 |

TABLE 1-continued

Effect of water (the co-solvent) on the selectivity of sulfolane under two liquid phases
Pressure: 75.0 cm Hg (absolute)
Overall liquid composition: 50 wt % n-heptane and 50 wt % toluene
Data from one-stage equilibrium cell

| S/F | Temp (° C.) | Water in solvent (wt %) | Vapor composition (wt %) Heptane | Toluene | R | No. liquid Phase |
|---|---|---|---|---|---|---|
| 4.0 | 105 | 0.0 | 80.05 | 19.95 | 3.95 | 2 |
| 4.0 | 103 | 1.0 | 77.41 | 22.59 | 3.38 | 2 |

S/F: Solvent-to-hydrocarbon weight ratio
R: Solvent selectivity = (Heptane in vapor/Heptane in liquid)/(Toluene in vapor/Toluene in liquid)

Table 1 shows that, in the two liquid phase region, the presence of water significantly reduces the sulfolane selectivity at all solvent-to-hydrocarbon ratios (S/F). Furthermore, unless the two liquid phases are completely mixed, the above-mentioned commercial operation of the three-meter diameter EDC showed erratic behavior that led to column failure when operating variables were changed. Therefore, it is undesirable to add reflux (the insoluble raffinate) to the EDC since that would cause expansion of the two-liquid phase region in the upper portion of the column when sulfolane is used as the solvent for aromatics recovery. In the case where there is no liquid reflux in the EDC to knock down the entrained solvent, the EDC overhead product (the raffinate) may contain undesirable levels of solvent depending upon the EDC overhead configuration.

With the present inventive extractive distillation process, the solvent-containing raffinate is fed to a water-wash system to reduce solvent content in the raffinate to a desired level as long as the solvent is soluble in water. In a preferred process configuration, the raffinate is fed to the lower portion of a counter-current extraction column that contains multi-stage contacting trays or packings, while the wash water is introduced to the upper portion of the column. In the application of the ED process for aromatics recovery, the wash water is withdrawn from the water leg of the overhead receivers from both of the EDC and the SRC. The water containing solvent that is removed from the bottom of the water wash column can be fed to the bottom of the SRC to generate stripping steam as well as to recover the solvent. Since water is already required to generate the stripping steam for the SRC, the water wash of the raffinate requires no extra energy. Water washed raffinate accumulates in the hydrocarbon phase near the top of the wash column and is recovered as the solvent-free raffinate product.

In another preferred embodiment of this invention, a slip stream of the lean solvent, instead of feeding to a separate water-wash system, is fed to lower portion of same water-wash system for washing the EDC raffinate stream, to remove and recover heavy hydrocarbons or to remove the polymers from the lean solvent. In a particular embodiment of this invention for aromatics recovery, the slip stream of the lean solvent is fed to the lower portion of a multi-stage counter-current water-wash column at a location just above the entry point of the raffinate feed from the EDC overhead. The amount of wash water fed to upper portion of the wash column is adjusted so that essentially the all the EDC raffinate and the heavy hydrocarbons from the lean solvent, if exist, are recovered from the top of the wash column. Adding both the EDC overhead raffinate stream and a slip stream of the lean solvent to the same water wash column normally requires no additional wash water, although the solvent laden wash water from the bottom of the water wash column contains more solvent as it is recycled to the SRC for generating stripping steam. Therefore, no extra energy is required. A magnetic filter is installed at the bottom exit of the water wash column to continuously remove the trace amount of tramp iron, polymeric sludge, and other polar impurities.

A. Extractive Distillation with Conventional Solvent Regeneration (Base Case).

The extractive distillation process shown in FIG. 1 employs of an extractive distillation column (EDC1), a solvent recovery column (SRC1) and a thermal solvent regenerator (SRG1) that is equipped with steam stripping. A hydrocarbon feed containing a mixture of polar and less-polar components is fed via line 1 to the middle portion of EDC1 while lean solvent from the bottom of SRC1 is fed via lines 16, 18 and 19 to the upper portion of EDC1 to absorb the polar hydrocarbons in EDC1. The solvent comprises a suitable water-soluble extractive solvent that is characteristically selective for absorbing the particular polar hydrocarbons in the feedstock. Some of these water-soluble solvents have limited solubility for the less-polar hydrocarbons and, when they are used, their presence tends to create two liquid phases in the upper portion of EDC1. A portion of the lean solvent from the bottom of SRC1 is heated in the boiler R2 and recycled to the bottom of SRC1 via line 17.

The solvent-to-hydrocarbon feed ratio (S/F), EDC1 bottom temperature, EDC1 pressure, and hydrocarbon feed tray locations are parameters that are adjusted to provide the necessary conditions to achieve the desired separation between the overhead raffinate and the bottom rich solvent.

An overhead raffinate exits from the top of EDC1 through line 2 and is condensed in a cooler C1 and then transferred via line 3 to an overhead receiver D1, which serves to effect a phase separation between the less-polar hydrocarbons and water. A portion of the less-polar hydrocarbon phase is recycled to the top of EDC1 as reflux via line 4 to knock down the entrained solvent in the vapor phase in the column, and the other portion is withdrawn as raffinate product via line 5.

A rich solvent stream containing the solvent, the polar hydrocarbons, and measurable levels of heavy hydrocarbons and/or polymers is withdrawn from the bottom of EDC1 via line 7. A portion of the rich solvent is heated in reboiler R1 and recycled to the bottom of EDC1 via line 8 to generate vapor stream in the column, while the rest of the rich solvent is fed to the middle portion of SRC1 through line 9.

Water phase that accumulates in the water leg of both overhead accumulators of D1 and D2 is optionally transferred to a water drum WD via lines 6 and 15, respectively. The water collected in the water drum is then fed to a steam generator SR1 through line 24 to generate stripping steam, which is injected via line 25 into the lower portion of SRC1 to assist in the removal of the polar hydrocarbons from the solvent. A polar hydrocarbons concentrate, which contains water and is substantially free of solvent and less-polar hydrocarbons, is withdrawn through line 10 as an overhead vapor stream from the SRC1 and introduced into an overhead receiver D2 via line 11 after condensing through cooler C2. To minimize the bottom temperature of the SRC1, a receiver D2 is connected to a vacuum source to generate sub-atmospheric conditions within SRC1. The overhead receiver D2 serves to effect a phase separation between the polar hydrocarbons phase, which is recovered, and the water phase. A portion of the polar hydrocarbon phase is recycled via lines 12, 13 to the top of the SRC1 as reflux to knock down the entrained solvent in the vapor stream of the SRC1, while the remaining portion is withdrawn as the polar hydrocarbons product through line 14.

To remove the heavies, which include heavy hydrocarbons, polymeric sludge, and tramp iron, and the other polar materials from the lean solvent, a slip stream is withdrawn from the lean solvent recycle loop and fed to the thermal solvent regenerator SRG1 via line 20. Stripping steam is introduced to the bottom of SRG1 through line 21 to assist in lean solvent recovery in the overhead stream; the lean solvent is recycled to the bottom of the SRC1 as a part of the stripping medium via line 22. A slurry containing tramp iron, polymeric sludge, and any other polar matters is withdrawn from the bottom of SRG1 via line 23.

Thermal stripping for regenerating lean solvent was developed for liquid-liquid extraction process for aromatics recovery. In the process, most of the measurable amount of heavy ($C_9$ to $C_{12}$) hydrocarbons in the feedstock are rejected by the solvent phase in the LLE column and removed with the raffinate phase as part of the non-aromatic product. Only $C_9$ aromatic compounds are likely to be extracted by the solvent and they are primarily stripped from the solvent in the solvent recovery column (SRC) under normal operating conditions. Therefore, the thermal solvent regenerator SRG1 will be grossly inadequate if the ED feedstock contains appreciable amounts of heavy ($C_9$-$C_{12}$) hydrocarbons or if the components in the feedstock demonstrate tendencies to polymerize under thermal conditions. If either of these contingencies occurs, the process becomes inoperable.

B. Extractive Distillation with Two Water-Wash Systems for Washing the Raffinate Stream and Regenerating the Lean Solvent Separately.

Figure 2:
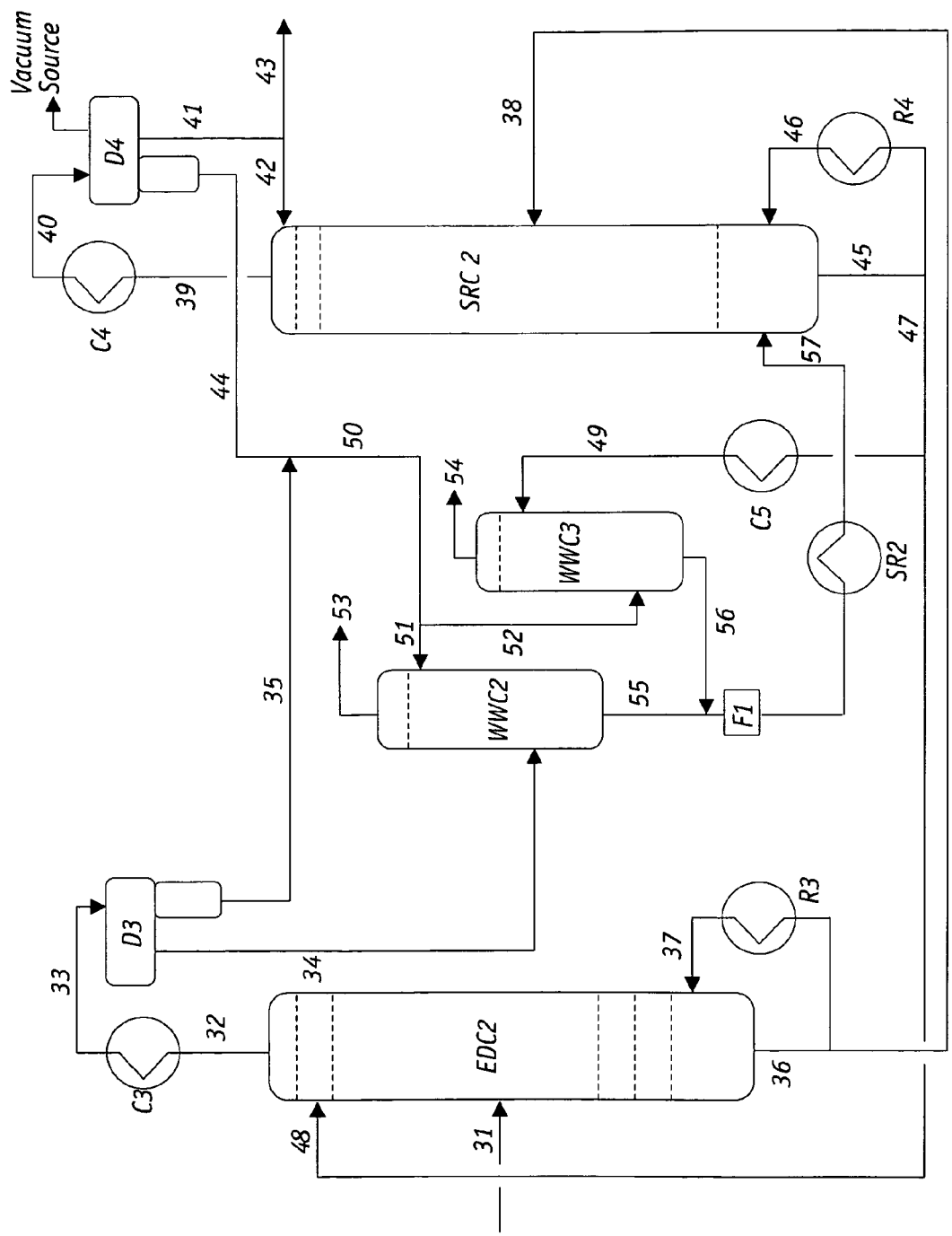
FIG. 2 is a schematic flow diagram of an extractive distillation process that uses two water-wash systems for separately washing the raffinate stream and regenerating the lean solvent.

The extractive distillation process depicted in FIG. 2 employs an extractive distillation column (EDC2), a solvent recovery column (SRC2), a solvent removal zone that is, for example, in the form of a water-wash column (WWC2) for removing entrained solvent from the EDC2 raffinate stream, and a heavy hydrocarbon removal zone that is, for example, in the form of a water-wash column (WWC3) for regenerating lean solvent. The major differences between the base case process of FIG. 1 and this inventive process are the: (1) elimination of the EDC reflux which saves energy at reboiler R3 and which potentially increases the EDC2 throughput, (2) removal of the entrained solvent from the raffinate at a low temperature, and use of a low cost water-wash system, which is preferably a counter-current extraction column (WWC2), that requires minimum or essentially no energy consumption, and (3) replacement of the inadequate, high temperature, high cost thermal solvent regenerator with a highly efficient, low temperature, low cost water-wash system (WWC3) for regenerating the lean solvent, which can contain excessive amounts of heavy hydrocarbons and/or polymers that could render the thermal solvent regenerator inoperable.

A hydrocarbon feed is fed via line 31 to the middle portion of EDC2 while lean solvent from the bottom of SRC2 is fed via lines 45, 47 and 48 to the upper portion of EDC2 to absorb the polar hydrocarbons in EDC2. A portion of the lean solvent is also heated in reboiler R4 and recycled to the bottom of SRC2 via line 46. Some of the water-soluble solvents used may have limited solubility with the less-polar hydrocarbons and their presence tends to create two liquid phases in the upper portion of EDC2. The operating conditions of EDC2 are adjusted to generate the desired separation between the overhead raffinate and the bottom rich solvent.

An overhead raffinate exits the top of EDC2 through line 32 and condenses in a cooler C3 before being transferred via line 33 to the overhead receiver D3, which serves to effect a phase separation between the less-polar (raffinate) hydrocarbons and the water phases. The raffinate hydrocarbon phase is then fed through line 34 to a lower portion of WWC2 to remove the entrained solvent through a counter-current water wash, while the water phase, that accumulates in the water leg from both EDC accumulator D3 and SRC accumulator D4, is fed via lines 35, 44, 50 and 51 to the upper portion of WWC2 as wash water. A washed raffinate hydrocarbon phase accumulates at the top of WWC2 and a solvent-free raffinate product is withdrawn via line 53. The spent water containing solvent is removed from the bottom of WWC2 and passed through a magnetic filter F1 via line 55. The magnetic filter preferably generates an electromagnetic field sufficient to channel tramp iron and other polar matters from the aqueous phase containing primarily water and solvent into a strainer, which is cleaned or replaced periodically. Filtered water is introduced to the steam generator SR2 to generate stripping steam, which is fed to the bottom of SRC2 via line 57. As shown in FIG. 2, the process does not employ a liquid reflux that would otherwise be established by connecting overhead receiver D3 to the top of EDC2.

A rich solvent stream, containing solvent, the polar (extract) hydrocarbons, and detectable heavy hydrocarbons and/or polymers, is withdrawn from the bottom of EDC2 and fed the middle portion of the SRC2 via lines 36 and 38. A portion of the rich solvent stream is heated by reboiler R3 and recycled back into the bottom portion of EDC2 via line 37.

Stripping steam generated from the steam generator SR2 is injected via line 57 into the lower portion of SRC2 to assist in the removal of the polar hydrocarbons from the solvent. A more-polar concentrate, containing water and being substantially free from solvent and less-polar hydrocarbons, is withdrawn through line 39 as an overhead vapor stream from SRC2 and introduced into an overhead receiver D4 via line 40 after condensing through cooler C4. In order to minimize the bottom temperature of SRC2, receiver D4 is connected to a vacuum source to generate sub-atmospheric condition in SRC2. The overhead receiver serves to effect a phase separation between the more-polar hydrocarbons phase and the water phase. A portion of the more-polar hydrocarbon phase is recycled to the top of SRC2 as the reflux via lines 41, 42 to knock down the entrained solvent in the vapor stream of the SRC2, while the other portion is withdrawn as the more-polar hydrocarbon product through line 43.

To remove the heavies including any tramp iron, heavy hydrocarbons, polymeric sludge, and any other polar matters from the lean solvent, a slip stream is withdrawn from the lean solvent recycle loop and fed to a separate water-wash system WWC3, which is preferably a counter-current extraction column. The slip stream represents only a minor volume (typically 1-2%) of the lean solvent stream. If the solvent density is higher than the water density, lean solvent is preferably be fed to upper portion of WWC3 via line 49 after cooling through cooler C5. Wash water is then introduced to the lower portion of WWC3 via line 52 to generate counter-current contact with the solvent. The solvent-laden water is withdrawn from the bottom of WWC3 via line 56 and combined with the water stream in line 55 before entering the magnetic filter F1 and steam generator for making the stripping steam for SRC2. Heavy hydrocarbons in the lean solvent accumulate in the top of WWC3 and withdrawn therefrom via line 54.

The heavy hydrocarbon removal zone can include various devices including, for example, a continuous multi-stage counter-current contacting device, multi-stage mixers/settler, or rotating type contactor. The heavy hydrocarbon removal zone can also be a water tank that serves as a decanter to separate heavy hydrocarbons and any sludge from an aqueous phase containing water-soluble solvent and water. Similarly, the solvent removal zone can include various devices including, for example, a continuous multi-stage counter-current contacting device, multi-stage mixers/settler, or rotating type contactor. The solvent removal zone can also be a tank wherein the less polar hydrocarbons are separated from an aqueous phase containing water with trace amounts of water-soluble solvent. Both the heavy hydrocarbon removal zone and solvent removal zone are preferably operated under mild conditions at a temperature of 25° to 80° C. and a pressure of 1 to 10 atmospheres and under a wash-to-solvent feed weight ratio of 0.5 to 10.

In an embodiment wherein the feed comprises aromatic and non-aromatics and the EDC is operated under such conditions as to maximize benzene recovery in the first solvent-rich stream by keeping substantially all $C_9^+$ hydrocarbons in the first solvent-rich stream. In another embodiment wherein the feed comprises aromatic and non-aromatics and the SRC is operated under such conditions as to strip only $C_8$ and lighter hydrocarbons from the first solvent-rich stream and to keep substantially all $C_9$ and heavier hydrocarbons in the second solvent-rich stream.

As further described herein, the inventive process can be modified include: (1) a one water-wash system for lean solvent regeneration only, while the raffinate produced from the conventional EDC with reflux to remove the entrained solvent, and thus, no water-wash is necessary and (2) a one water-wash system for removing trace solvent in the raffinate produced from the novel EDC without reflux, while the lean solvent is regenerated from the conventional thermal solvent regenerator.

C. Extractive Distillation with a Single Water-Wash System for Both Washing the Raffinate Stream and Regenerating the Lean Solvent.

Figure 3:
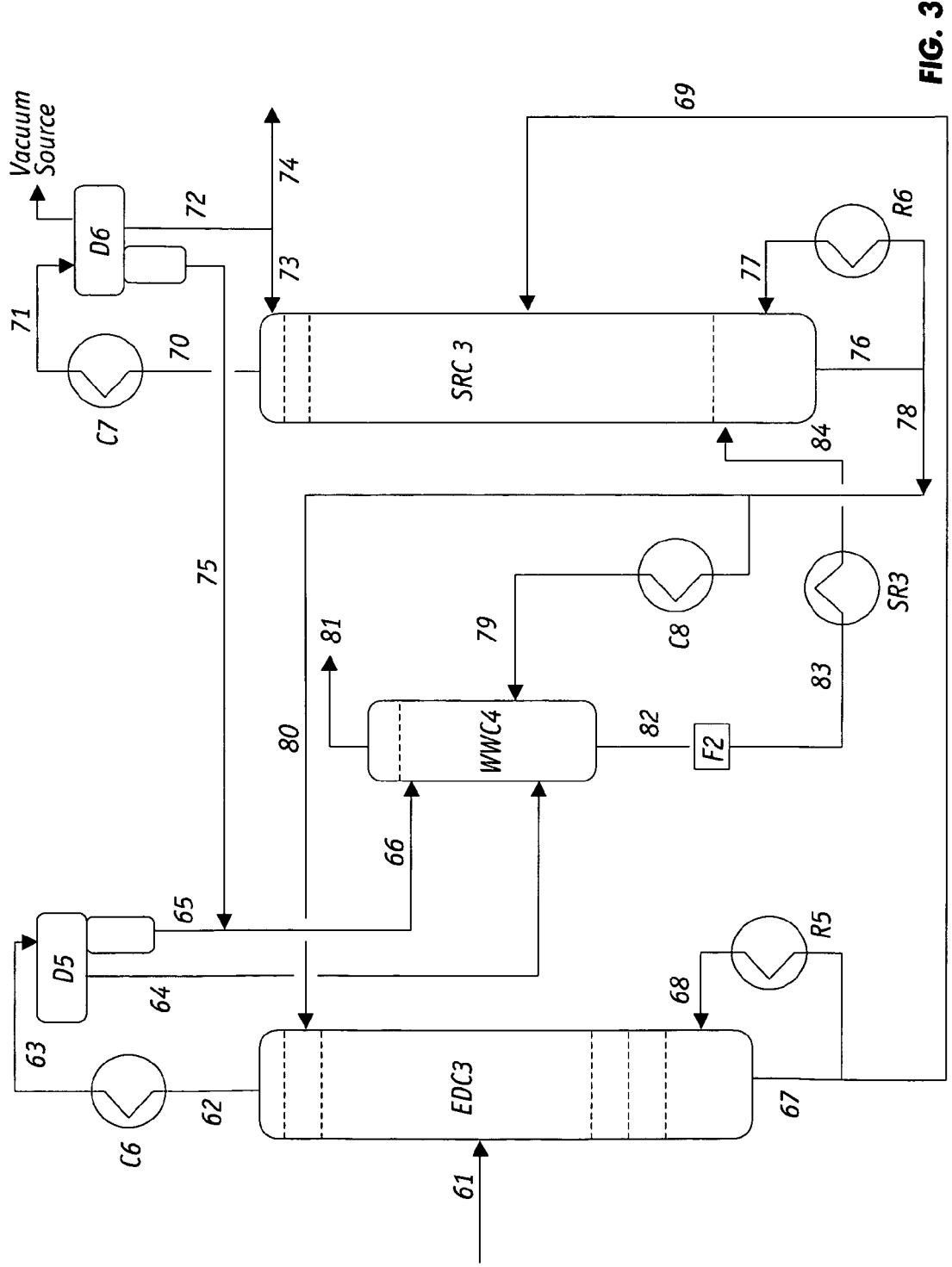
FIG. 3 is a schematic flow diagram of an extractive distillation process that uses a single water-wash system for both washing the raffinate stream and regenerating the lean solvent.

The extractive distillation process illustrated in FIG. 3 includes of an extractive distillation column (EDC3), a solvent recovery column (SRC3), and a single water-wash column that is employed for removing solvent from EDC raffinate stream and for regenerating the lean solvent (WWC4). The major differences between the base case process and this inventive process are the: (1) elimination of the EDC reflux to reduce the energy requirement at reboiler R5 and to potentially increase the EDC throughput, (2) removal of the entrained solvent from the raffinate in a low temperature and low cost water-wash system, preferably a counter-current extraction column (WWC4), at essentially no energy requirement, and (3) replacement of the conventional thermal solvent regenerator with a dual functional water-wash system (WWC4) to regenerate the lean solvent which can contain excessive amount of heavy hydrocarbons or polymers.

A hydrocarbon feed is fed via line 61 to the middle portion of EDC3, while lean solvent from the bottom of SRC3 is fed via lines 76, 78 and 80 to the upper portion of the EDC3 to absorb the polar hydrocarbons in EDC2. A portion of the lean solvent is heated by reboiler R6 and recycled back into SRC3 via 77. Some of these water-soluble solvents have limited solubility for the less-polar hydrocarbons and tend to create two liquid phases in the upper portion of the EDC3. The conditions in EDC3 are adjusted to generate the desired separation between the overhead raffinate and the bottom rich solvent.

Overhead raffinate exits the top of EDC3 through line 62 and condenses in cooler C6 before being transferred via line 63 to overhead receiver D5, which serves to effect a phase separation between the less-polar hydrocarbons and the water phases. The raffinate (less-polar hydrocarbon) phase is then fed through line 64 to the lower portion of WWC4 to remove the entrained solvent through a counter-current water wash. As shown in FIG. 3, there is no liquid reflux from the overhead receiver D5 to the top of EDC3. The water phase accumulated in the water leg of accumulator D5 is fed via lines 65 and 66 to the upper portion of WWC4 as the wash water.

A rich solvent stream containing the solvent, the polar hydrocarbons, and detectable heavy hydrocarbons or polymers is withdrawn from the bottom of EDC3 and fed to the middle portion of the SRC3 via lines 67 and 69. A portion of the rich solvent stream is heated by reboiler R5 and recycled back into EDC3 via line 68.

Stripping steam generated from steam generator SR3 is injected via line 84 into the lower portion of SRC3 to assist in the removal of the polar hydrocarbons from the solvent. A more-polar concentrate, which contains water and is substantially free from solvent and less-polar hydrocarbons, is withdrawn through line 70 as an overhead vapor stream from SRC3 and introduced into an overhead receiver D6 via line 71 after condensing through cooler C7. Receiver D6 is connected to a vacuum source to generate sub-atmospheric condition in the SRC3. The overhead receiver serves to effect a phase separation between the polar hydrocarbon phase and the water phase. A portion of the polar hydrocarbon phase is recycled to the top of SRC3 as the reflux via lines 72, 73 to knock down the entrained solvent in the vapor stream of SRC3, while the other portion is withdrawn as the more-polar hydrocarbon product through line 74. The water phase accumulated in the water leg of accumulator D6 is fed via lines 75, 66 to the upper portion of the WWC4 as the wash water.

To remove the heavies, including any tramp iron, heavy hydrocarbons, polymeric sludge, and other polar matters from the lean solvent, a slip stream is withdrawn from the lean solvent recycle loop and fed to lower portion of WWC4 via line 79 after cooling through cooler C8, at an entry point which is above the entry point of the EDC raffinate stream. The solvent-laden water containing any tramp iron, polymeric sludge or any other polar matters is withdrawn from the bottom of WWC4 and passed through the magnetic filter F2 via line 82. Filtered water with solvent from F2 is fed to the steam generator SR3 via line 83 for making the stripping steam for the SRC3. A washed hydrocarbon phase containing the raffinate stream from EDC3 and the heavy hydrocarbons from the lean solvent is accumulated at the top of WWC4 as a solvent-free raffinate product is withdrawn through line 81.

D. Extractive Distillation with Single Water-Wash System for Both Washing the Raffinate Stream and Regenerating the Lean Solvent with an Auxiliary Thermal Solvent Regenerator.

Figure 4:
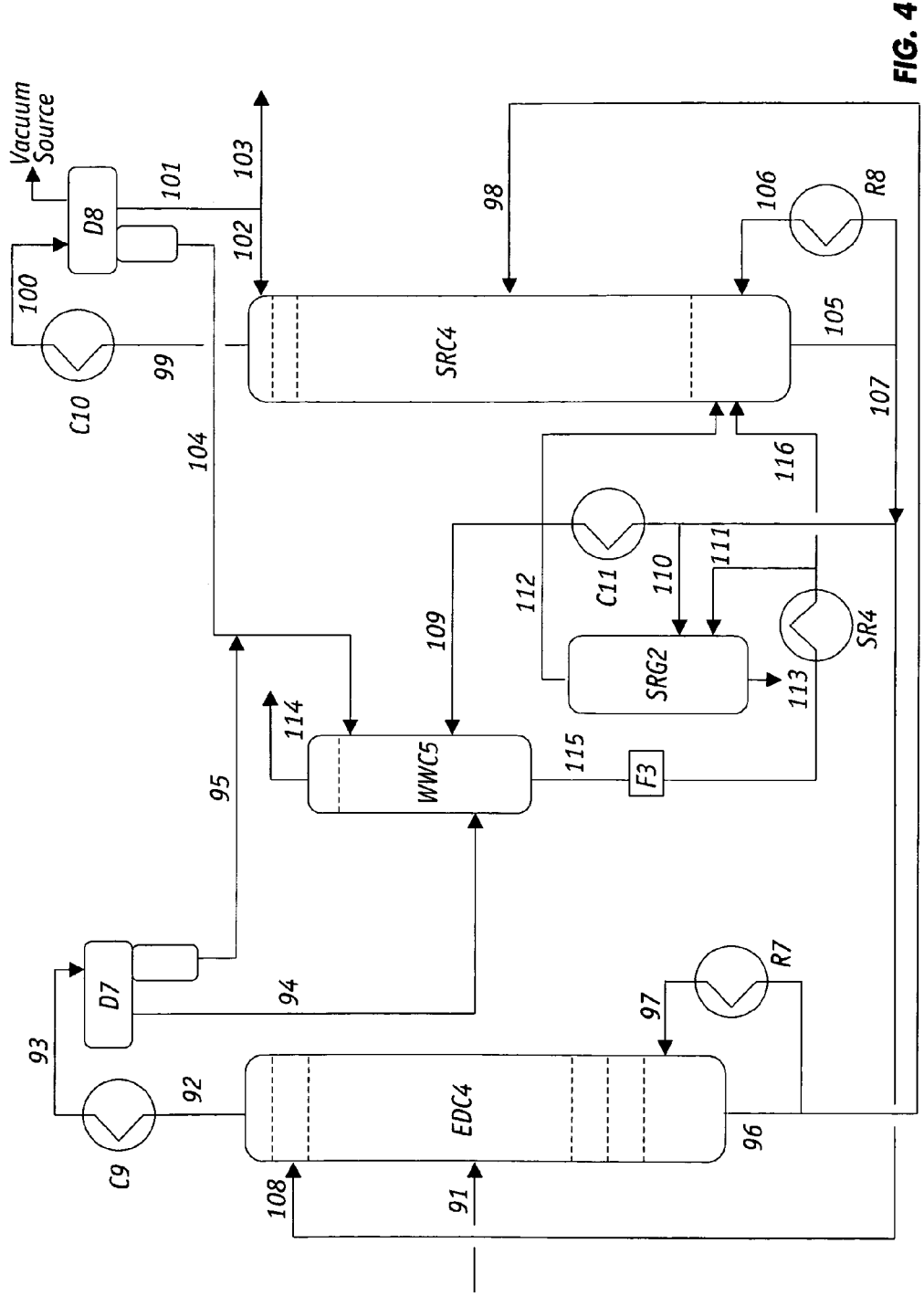
FIG. 4 is a schematic flow diagram of an extractive distillation process that uses a single water-wash system having an auxiliary thermal solvent regenerator for both washing the raffinate stream and regenerating the lean solvent.

Referring to FIG. 4, the process is mainly comprised of an extractive distillation column (EDC4), a solvent recovery column (SRC4), and a water-wash column (WWC5) that serves to remove solvent from an EDC raffinate stream as well as to regenerate the lean solvent. The major differences between the process scheme shown in FIG. 3 and that of FIG. 4 is the addition of a conventional thermal solvent regenerator (SRG2) that functions as an auxiliary unit to reduce the loading of the dual functional water-wash system (WWC5) during lean solvent regeneration. The operations and conditions of the extractive distillation column (EDC4), solvent regeneration column (SRC4), and water-wash column (WWC5) are similar to the corresponding units shown in FIG. 3, although some minor adjustments may be needed to accommodate the addition of the thermal solvent regenerator (SRG2). This extractive distillation process with a single water-wash system is particularly suited for regenerating the lean solvent in ED process applications where excessive amounts of (i) tramp iron, (ii) sludge that is generated from polymerization of active components in the hydrocarbon feed, and/or (iii) decomposed fragments of solvent are present in the lean solvent.

A hydrocarbon feed is fed via line 91 to the middle portion of EDC4 while lean solvent from the bottom of SRC4 is fed via lines 105, 107 and 108 to the upper portion of EDC4 to absorb the polar hydrocarbons in the EDC4. A portion of the lean solvent is heated by reboiler R8 and recycled back into SRC4 via line 106. Some of these water-soluble solvents have limited solubility for the less-polar hydrocarbons and tend to create two liquid phases in the upper portion of the EDC4. The conditions in EDC4 are adjusted to generate the desired separation between the overhead raffinate and the bottom rich solvent.

Overhead raffinate exits the top of EDC4 through line 92 and condenses in cooler C9 before being transferred via line 93 to the overhead receiver D7, which serves to effect a phase separation between the less-polar hydrocarbon and the water phases. The raffinate (less-polar hydrocarbon) phase is then fed through line 94 to the lower portion of the WWC5 to remove the entrained solvent through a counter-current water wash. As shown in FIG. 4, there is no liquid reflux from the overhead receiver D7 to the top of EDC4. A water phase accumulates in the water leg of accumulator D7 and is fed via line 95 to the upper portion of WWC5 as the wash water.

A rich solvent stream containing the solvent, the polar hydrocarbons, and detectable heavy hydrocarbons and/or polymers is withdrawn from the bottom of EDC4 and fed to the middle portion of the SRC4 via lines 96 and 98. A portion of the rich solvent stream is heated by reboiler R7 and recycled back into EDC4 via line 97. Stripping steam generated from steam generator SR4 is injected via line 116 into the lower portion of SRC4 to assist in the removal of the polar hydrocarbons from the solvent; stripping steam is also injected into SRG2 via line 111. A more-polar concentrate, which contains water and is substantially free from solvent and less-polar hydrocarbons, is withdrawn through line 99 as an overhead vapor stream from SRC4 and introduced into an overhead receiver D8 via line 100 after condensing through cooler C10. Receiver D8 is connected to a vacuum source to generate sub-atmospheric condition in the SRC4. The overhead receiver serves to effect a phase separation between the polar hydrocarbon phase and the water phase. A portion of the polar hydrocarbon phase is recycled to the top of SRC4 as the reflux via lines 101, 102 to knock down the entrained solvent in the vapor stream of SRC4, while the other portion is withdrawn as the more-polar hydrocarbon product through line 103. A water phase accumulates in the water leg of accumulator D8 and is fed via lines 104 to the upper portion of the WWC5 as the wash water.

To remove the heavies, including any tramp iron, heavy hydrocarbons, polymeric sludge, and other polar matters from the lean solvent, slip streams from the lean solvent recycle loop are fed to both the (1) water-wash column (WWC5) via line 109 after cooling through cooler C11 at an entry point which is above the entry point of the EDC4 raffinate stream and (2) thermal solvent regenerator (SRG2) via line 110. The solvent-laden water containing any tramp iron, polymeric sludge or any other polar matters is withdrawn from the bottom of WWC5 and passed through the magnetic filter F3 via line 115. Filtered water with solvent from F3 is fed to steam generator SR4. A washed hydrocarbon phase containing the raffinate stream from EDC4 and the heavy hydrocarbons from the lean solvent accumulates at the top of WWC5 and solvent-free raffinate product is withdrawn through line 114. Finally, a slurry containing tramp iron, polymeric sludge and any other polar matters is discharged from the bottom of SRG2 via line 113 and a solvent stream 112 is withdrawn from SRG2 and directed to SRC4.

The WWC5 is efficient in removing excessive amounts of heavy hydrocarbons from the lean solvent, as valuable by-products whereas SRG2 is better in removing tramp iron and polymeric sludge, although at higher energy costs and with limited capacity. Thus, the proportions of the slip streams that are diverted to WWC5 and SGR2 can be adjusted to accommodate the composition of the lean solvent. SRG2 can be regarded as being an auxiliary unit to WWC5.

E. Extractive Distillation Process with a Single Water-Wash System for Washing the Raffinate Stream and a Thermal Regenerator for Regenerating the Lean Solvent.

Figure 5:
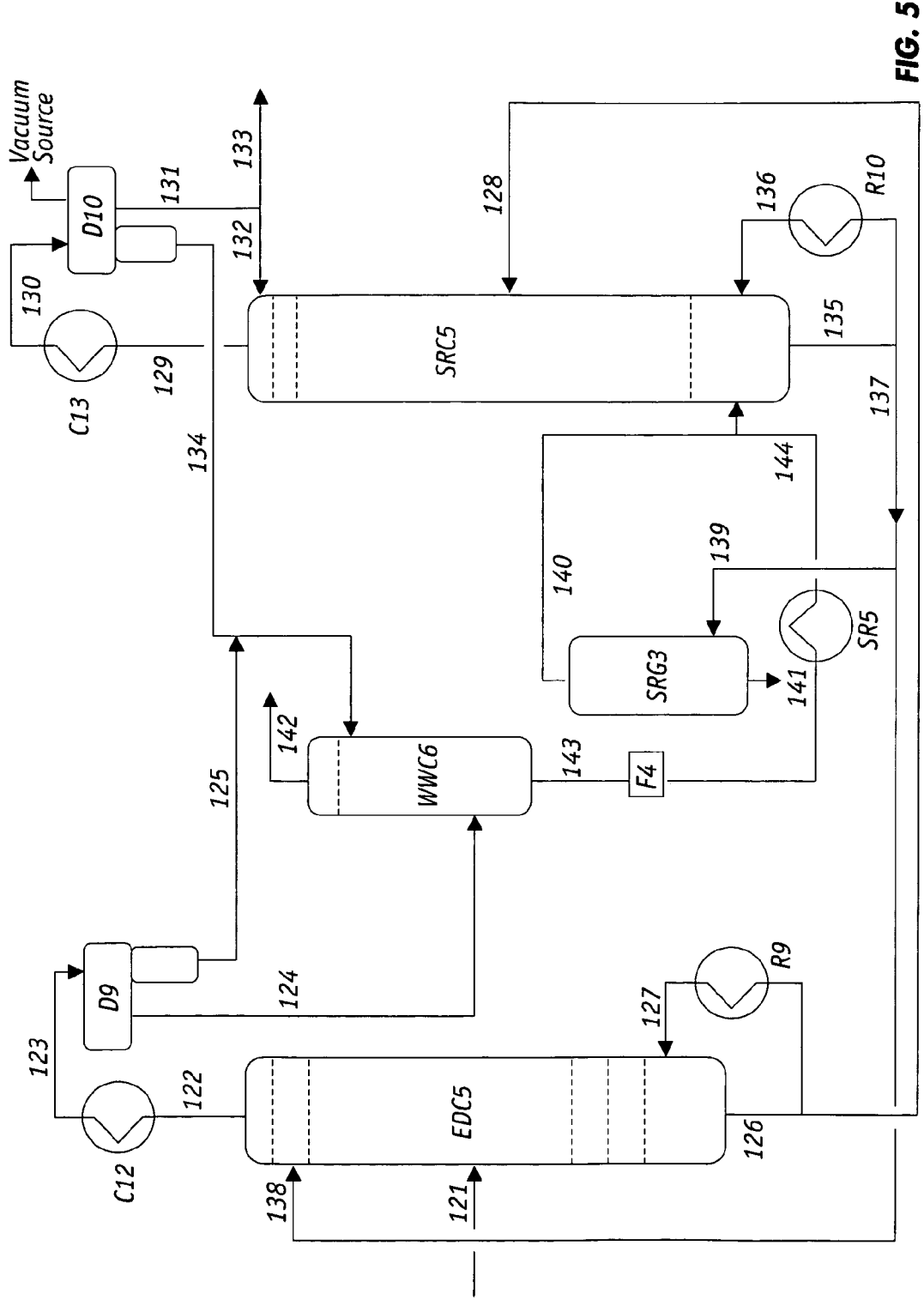
FIG. 5 is a schematic flow diagram of an extractive distillation process that uses a single water-wash system for washing the raffinate stream and a thermal regenerator for regenerating the lean solvent.

The extractive distillation process illustrated in FIG. 5 includes an extractive distillation column (EDC5), a solvent recovery column (SRC5), a water-wash column (WWC6) for removing the entrained solvent from an EDC raffinate stream, and a conventional thermal stripping regenerator (SRG3) for regenerating lean solvent. This process eliminates the use of a liquid reflux at the top of EDC5, which results in energy savings at the bottom reboiler (R9), and reduces the loading of the upper portion of EDC5, thereby increasing the process throughput if bottlenecking were to occur at this juncture. Another advantage is the minimization of the two liquid phases that exist in the upper portion of EDC5 for those ED processes using solvents having limited solubility of the less-polar hydrocarbons, thereby improving the performance of EDC5.

A hydrocarbon feed is fed via line 121 to the middle portion of EDC5 while lean solvent from the bottom of SRC5 is fed via lines 135, 137 and 138 to the upper portion of EDC5 to absorb the polar hydrocarbons in EDC5. Overhead raffinate exits the top of EDC5 through line 122 and condenses in cooler C12 before being transferred via line 123 to overhead receiver D9, which serves to effect a phase separation between the less-polar hydrocarbon and the water phases. The raffinate (less-polar hydrocarbon) phase is then fed through line 124 to the lower portion of the WWC6 to remove the entrained solvent through a counter-current water wash. As shown in FIG. 5, there is no liquid reflux from the overhead receiver D9 to the top of EDC5. A water phase accumulates in the water leg of accumulator D9 and is fed via lines 125 to the upper portion of WWC6 as the wash water.

Rich solvent stream containing the solvent, the polar hydrocarbons, and detectable heavy hydrocarbons and/or polymers is withdrawn from the bottom of EDC5 and fed to the middle portion of the SRC5 via lines 126 and 128. A portion of the rich solvent is heated by reboiler R9 and recycled into EDC5 via line 127. Stripping steam generated from steam generator SR5 is injected via line 144 into the lower portion of SRC5. A more-polar concentrate, which contains water and is substantially free from solvent and less-polar hydrocarbons, is withdrawn through line 129 as an overhead vapor stream from SRC5 and introduced into an overhead receiver D10 via line 130 after condensing through cooler C13. Receiver D10 is connected to a vacuum source to generate sub-atmospheric condition in SRC5. The overhead receiver serves to effect a phase separation between the polar hydrocarbon phase and the water phase. A portion of the polar hydrocarbon phase is recycled to the top of SRC5 as the reflux via lines 131, 132 to knock down the entrained solvent in the vapor stream of SRC5, while the other portion is withdrawn as polar hydrocarbon product through line 133. A water phase accumulates in the water leg of accumulator D10 and is fed via lines 134 to an upper portion of WWC6 as the wash water. A washed hydrocarbon phase containing the raffinate stream from EDC5 and the heavy hydrocarbons from the lean solvent is accumulated at the top of WWC6 as a solvent-free raffinate product is withdrawn through line 142.

The solvent-laden water containing any tramp iron, polymeric sludge or any other polar matters is withdrawn from the bottom of WWC6 and passed through a magnetic filter F4 via line 143. Filtered water with the solvent from F4 is fed to steam generator SR5. A slip stream from the lean solvent loop is fed to the thermal solvent regenerator (SRG3) via line 139. A slurry containing tramp iron, polymeric sludge, and any other polar matters is withdrawn from the bottom of SRG3 via line 141. An overhead stream from SGR3 containing steam with solvent is fed via 140 to SRC5. A portion of the lean solvent is heated by reboiler R10 and recycled back into SRC5 via line 136.

F. Extractive Distillation Process with Single Water-Wash System for Regenerating the Lean Solvent.

Figure 6:
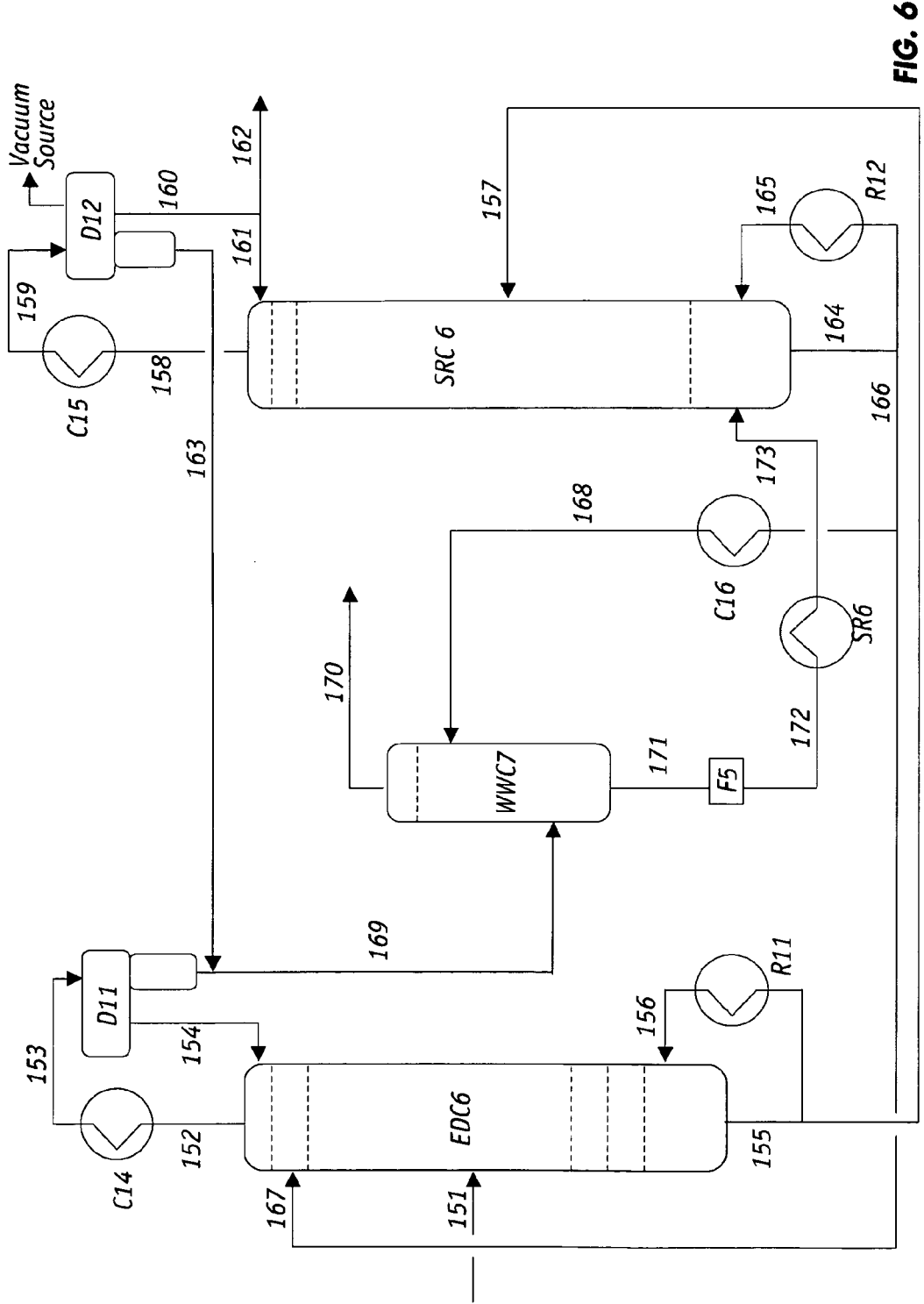
FIG. 6 is a schematic flow diagram of an extractive distillation process that uses a single water-wash system for regenerating the lean solvent.

The extractive distillation process shown in FIG. 6 includes an extractive distillation column (EDC6), a solvent recovery column (SRC6), and a low temperature, energy saving and easy-to-operate water-wash system (WWC7) that replaces the typical high temperature, energy intensive, and difficult-to-operate lean solvent regenerator. This process is especially advantageous if the lean solvent contains excessive amounts of heavy hydrocarbons and/or polymeric sludge, which cannot be effectively removed from the lean solvent by a conventional thermal stripping regenerator.

A hydrocarbon feed is fed via line 151 to the middle portion of EDC6 while lean solvent from the bottom of SRC6 is fed via lines 164, 166 and 167 to the upper portion of EDC6 to absorb the polar hydrocarbons in EDC6. A portion of the lean solvent is heated by reboiler R12 and is recycled back into SRC6 via line 165. Overhead raffinate exits the top of EDC6 through line 152 and condenses in cooler C14 before being transferred via line 153 to the overhead receiver D11, which serves to effect a phase separation between the less-polar hydrocarbon and the water phases. The less polar hydrocarbon phase is recycled to the top of EDC6 as the reflux via line 154 to knock down entrained solvent in the raffinate stream from EDC6. A water phase accumulates in the water leg of accumulator D11 and is fed via lines 169 to the lower portion of WWC7 as wash water.

To remove the heavies including any tramp iron, heavy hydrocarbons, polymeric sludge, and any other polar matters from the lean solvent, a slip stream 168 is withdrawn from the lean solvent recycle loop and fed to the upper portion of a separate water-wash system WWC7 after passing cooler C16, assuming the solvent density is higher than that of water. WWC7 is preferably a counter-current extraction column.

A rich solvent stream containing the solvent, the polar hydrocarbons, and detectable heavy hydrocarbons and/or polymers is withdrawn from the bottom of EDC6 and fed to the middle portion of the SRC6 via lines 155 and 157. A portion of the rich solvent stream is heated by reboiler R11 and is recycled back into EDC6 via line 156. Receiver D12 is connected to a vacuum source to generate sub-atmospheric condition in SRC6. Stripping steam generated from steam generator SR6 is injected via line 173 into the lower portion of SRC6. A polar concentrate, which contains water and is substantially free from solvent and less-polar hydrocarbons, is withdrawn through line 158 as an overhead vapor stream from SRC6 and is introduced into an overhead receiver D12 via line 159 after condensing through cooler C15. The overhead receiver serves to effect a phase separation between the polar hydrocarbon phase and the water phase. A portion of the polar hydrocarbon phase is recycled to the top of SRC6 as the reflux via lines 160, 161 while the other portion is withdrawn as the polar hydrocarbon product through line 162. A water phase accumulates in the water leg of accumulator D12 and is fed via lines 163 to the lower portion of WWC7 as the wash water, assuming its density is lower than that of water. A washed hydrocarbon phase containing the heavy hydrocarbons from the lean solvent is accumulated at the top of WWC7 as a solvent-free raffinate product and is withdrawn through line 170.

The solvent-laden water containing any tramp iron, polymeric sludge or any other polar matters is withdrawn from the bottom of WWC7 and passed through the magnetic filter F5 via line 171. Filtered water with solvent from F5 is fed to steam generator SR6 via line 172 to generate stripping steam for SRC6 via line 173.

The ED processes depicted in FIGS. 2-6 can be employed for lean solvent regeneration and EDC raffinate solvent removal for a variety of feedstock compositions Exemplary combinations of feedstock, solvent system, and resulting product are set forth in the following Table 2.

TABLE 2

| Feedstock | Solvent System | Product |
| --- | --- | --- |
| $C_6$-$C_8$ Pyrolysis Gasoline | Sulfolane/Water | BTX Aromatics |
| $C_6$-$C_8$ Reformate | Sulfolane/Water | BTX Aromatics |
| $C_6$-$C_7$ Reformate | Sulfolane/Water | BT Aromatics |
| $C_6$-$C_7$ Reformate | N-Formyl Morpholine | BT Aromatics |
| Coke Oven Oil | N-Formyl Morpholine | Benzene |
| $C_4$ Cut of Pyrolysis Gasoline | Dimethyl Formamide | 1,3 Butadiene |
| $C_4$ Cut of Pyrolysis Gasoline | Acetonitrile | 1,3 Butadiene |
| $C_8$ Cut of Pyrolysis Gasoline | Sulfolane/Water | Styrene |
| $C_6$ Cut of Natural Gas Liquid/Naphtha | Tetraethylene Glycol/Cyclohexanol | Cyclohexane |
| $C_5$ Cut of Natural Gas Liquid/Naphtha | Tetraethylene Glycol/Cyclohexanol | Cyclopentane |

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An extractive distillation process, whereby a polar hydrocarbon selective, water-soluble solvent is recovered from a solvent-rich stream containing the selective solvent, and measurable amounts of heavy hydrocarbons and sludge, which comprises the steps of:

(a) introducing a feed containing a polar hydrocarbon and a less polar hydrocarbon into a middle portion of an extractive distillation column (EDC) and introducing a selective solvent feed stream into an upper portion of the EDC;

(b) recovering a water-containing, less polar hydrocarbon-rich stream from the top of the EDC and withdrawing a first solvent-rich stream containing water-soluble solvent and polar hydrocarbon from the bottom of the EDC;

(c) introducing the first solvent-rich stream into a middle portion of a solvent recovery column (SRC) and recovering a polar hydrocarbon-rich stream, that is substantially free of water-soluble solvent and less polar hydrocarbon, from the top of SRC, and removing a second solvent-rich stream from the bottom of the SRC;

(d) introducing a greater portion of the second solvent-rich stream into the upper portion of the EDC in step (a) as the selective solvent feed stream and introducing a minor portion of the second solvent-rich stream into a heavy hydrocarbon removal zone;
(e) separating a first water stream from the water-containing less polar hydrocarbon-rich stream that is recovered from the top of the EDC in step (b) and separating a second water stream from the polar hydrocarbon-rich stream that is recovered from the top of the SRC in step (c);
(f) introducing at least a portion of the first stream of water and at least a portion of the second stream of water into the heavy hydrocarbon removal zone and recovering water-soluble solvent in an aqueous phase and rejecting heavy hydrocarbons into an oil phase;
(g) withdrawing an accumulated oil phase containing the heavy hydrocarbons from the heavy hydrocarbon removal zone and recovering an aqueous phase containing the water-soluble solvent from the heavy hydrocarbon removal zone;
(h) separating water from the water-containing less polar hydrocarbon-rich stream in step (b) to generate a less polar hydrocarbon-rich stream that is introduced into a solvent removal zone and introducing a portion of the first stream of water, or a portion of the second stream of water, or a portion of both the first and second streams of water from step (e) into a solvent removal zone thereby extracting entrained water-soluble solvent and rejecting the less polar hydrocarbons;
(i) withdrawing an accumulated oil phase containing the less polar hydrocarbons from the solvent removal zone and recovering an aqueous phase containing water-soluble solvent from the solvent removal zone;
(j) removing tramp iron and polymeric sludge from the aqueous phase from step (g) to yield a solids-free aqueous phase; and
(k) introducing the aqueous phase from step (h) and the solids-free aqueous phase from step (j) into a steam generator and vaporizing water to form stripping steam which is introduced into the lower portion of the SRC in step (c).

2. The process of claim 1 wherein the feed containing polar and less polar hydrocarbons includes a mixture of: (a) aromatics and non-aromatics, (b) diolefins and olefins, (c) naphthenes and paraffins, or (d) styrene and $C_8$ aromatics.

3. The process of claim 2 wherein the feed comprises aromatic and non-aromatics and the water-soluble solvent comprises aqueous sulfolane.

4. The process of claim 2 wherein the feed comprises aromatic and non-aromatics and the water-soluble solvent comprises aqueous N-formyl morpholine.

5. The process of claim 2 wherein the feed comprises butadiene and $C_4$ olefins and the water-soluble solvent comprises aqueous dimethyl formamide.

6. The process of claim 2 wherein the feed comprises styrene and $C_8$ aromatics and the water-soluble solvent comprises aqueous sulfolane.

7. The process of claim 1 wherein the water-soluble solvent is selected from the group consisting of sulfolane, polyalkylene glycols, N-substituted morpholine, furfural, acetonitrile, dimethyl formamide, dimethyl acetamide, N-methylpyrrolidone, 3-methoxy propionitrile, and mixtures thereof.

8. The process of claim 7 wherein the water-soluble solvent includes water as a cosolvent.

9. The process of claim 1 wherein the heavy hydrocarbon removal zone comprises a thermal solvent regenerator.

10. The process of claim 1 wherein each of the heavy hydrocarbon removal zone and the solvent removal zone comprises a continuous multi-stage counter-current contacting device, a multi-stage mixers/settler, or a rotating type contactor.

11. The process of claim 1 wherein the heavy hydrocarbon removal zone comprises a water tank serving as a decanter to separate heavy hydrocarbons and any sludge from a aqueous phase containing water-soluble solvent and water and the solvent removal zone comprises a tank wherein the less polar hydrocarbons are separated from an aqueous phase containing water with trace amounts of water-soluble solvent.

12. The process of claim 1 wherein the feed comprises aromatic and non-aromatics and the EDC is operated under such conditions as to maximize benzene recovery in the first solvent-rich stream by keeping substantially all $C_9^+$ hydrocarbons in the first solvent-rich stream.

13. The process of claim 1 wherein the feed comprises aromatic and non-aromatics and the SRC is operated under such conditions as to strip only $C_8$ and lighter hydrocarbons from the first solvent-rich stream and to keep substantially all $C_9$ and heavier hydrocarbons in the second solvent-rich stream.

14. The process of claim 1 wherein the EDC is operated without a liquid reflux at the top of the column.

15. The process of claim 1 wherein in step (g) a thermal solvent regenerator is used as an auxiliary unit for the heavy hydrocarbon removal zone for sludge removal.

16. An extractive distillation process, whereby a polar hydrocarbon selective, water-soluble solvent is recovered from a solvent-rich stream containing the selective solvent and measurable amounts of heavy hydrocarbons and sludge, which comprises the steps of:
(a) introducing a feed containing a polar hydrocarbon and a less polar hydrocarbon into a middle portion of an extractive distillation column (EDC) and introducing a selective solvent feed stream into an upper portion of the EDC;
(b) recovering a water-containing, less polar hydrocarbon-rich stream from the top of the EDC and withdrawing a first solvent-rich stream containing water-soluble solvent and polar hydrocarbon from the bottom of the EDC;
(c) introducing the first solvent-rich stream into a middle portion of a solvent recovery column (SRC) and recovering a polar hydrocarbon-rich stream, that is substantially free of water-soluble solvent and less polar hydrocarbon, from the top of SRC, and removing a second solvent-rich stream from the bottom of the SRC;
(d) introducing a greater portion of the second solvent-rich stream into the upper portion of the EDC in step (a) as the selective solvent feed stream and introducing a minor portion of the second solvent-rich stream into a heavy hydrocarbon removal zone;
(e) separating a first water stream from the water-containing less polar hydrocarbon-rich stream that is recovered from the top of the EDC in step (b) and separating a second water stream from the polar hydrocarbon-rich stream that is recovered from the top of the SRC in step (c);
(f) introducing at least a portion of the first stream of water and at least a portion of the second stream of water into the heavy hydrocarbon removal zone and recovering water-soluble solvent in an aqueous phase and rejecting heavy hydrocarbons into an oil phase;
(g) withdrawing an accumulated oil phase containing the heavy hydrocarbons from the heavy hydrocarbon removal zone and recovering an aqueous phase containing the water-soluble solvent from the heavy hydrocarbon removal zone;

(h) recycling at least a portion of the less polar hydrocarbon-rich stream that is separated from the first water stream in step (e) into the top of the EDC to knock down the entrained water-soluble solvent in the EDC overhead vapor producing a less polar hydrocarbon-rich stream substantially free of said water-soluble solvent;

(j) removing tramp iron and polymeric sludge from the aqueous phase from step (g) to yield a solids-free aqueous phase; and (k) introducing the solids-free aqueous phase from step (j) into a steam generator and vaporizing water to form stripping steam which is introduced into the lower portion of the SRC in step (c).

17. An extractive distillation process, whereby a polar hydrocarbon selective, water-soluble solvent is recovered from a solvent-rich stream containing the selective solvent and measurable amounts of heavy hydrocarbons and sludge, which comprises the steps of:

(a) introducing a feed containing a polar hydrocarbon and a less polar hydrocarbon into a middle portion of an extractive distillation column (EDC) and introducing a selective solvent feed stream into an upper portion of the EDC;

(b) recovering a water-containing, less polar hydrocarbon-rich stream from the top of the EDC and withdrawing a first solvent-rich stream containing water-soluble solvent and polar hydrocarbon from the bottom of the EDC;

(c) introducing the first solvent-rich stream into a middle portion of a solvent recovery column (SRC) and recovering a polar hydrocarbon-rich stream, that is substantially free of water-soluble solvent and less polar hydrocarbon, from the top of SRC, and removing a second solvent-rich stream from the bottom of the SRC;

(d) introducing a greater portion of the second solvent-rich stream into the upper portion of the EDC in step (a) as the selective solvent feed stream and introducing a minor portion of the second solvent-rich stream into a lower portion of a water-wash zone;

(e) separating water from the water-containing less polar hydrocarbon-rich stream that is recovered from the top of the EDC in step (b) to yield a first water stream and a less polar hydrocarbon-rich stream which is introduced into the water-wash zone at an entry point below that of the second solvent-rich stream;

(f) separating a first water stream from the water-containing, less polar hydrocarbon-rich stream that is removed in step (b) and separating a second water stream from the polar-hydrocarbon rich stream that is recovered from the top of the SRC in step (c);

(g) introducing at least a portion of the first stream of water and the second stream of water into an upper portion of the water-wash zone and recovering water-soluble solvent in an aqueous phase and rejecting less-polar hydrocarbons and heavy hydrocarbons into an oil phase;

(h) withdrawing an accumulated oil phase containing the less polar hydrocarbons and the heavy hydrocarbons from an upper portion of the water-wash zone and withdrawing an aqueous phase containing water-soluble solvent and any sludge from the bottom of the water-wash zone;

(i) removing tramp iron and polymeric sludge from the aqueous phase in step (h) to yield a solids-free aqueous phase; and (j) introducing the solids-free aqueous phase from step (i) into a steam generator and vaporizing water to form stripping steam which is introduced into the lower portion of the SRC in step (c).

18. The process of claim 17 wherein the feed containing polar and less polar hydrocarbons includes a mixture of: (a) aromatics and non-aromatics, (b) diolefins and olefins, (c) naphthenes and paraffins, and (d) styrene and $C_8$ aromatics.

19. The process of claim 18 wherein the feed comprises aromatic and non-aromatics and the water-soluble solvent comprises aqueous sulfolane.

20. The process of claim 18 wherein the feed comprises aromatic and non-aromatics and the water-soluble solvent comprises aqueous N-formyl morpholine.

21. The process of claim 18 wherein the feed comprises butadiene and $C_4$ olefins and the water-soluble solvent comprises aqueous dimethyl formamide.

22. The process of claim 18 wherein the feed comprises styrene and $C_8$ aromatics and the water-soluble solvent comprises aqueous sulfolane.

23. The process of claim 17 wherein the water-soluble solvent is selected from the group consisting of sulfolane, polyalkylene glycols, N-substituted morpholine, furfural, acetonitrile, dimethyl formamide, dimethyl acetamide, N-methylpyrrolidone, 3-methoxy propionitrile, and mixtures thereof.

24. The process of claim 23 wherein the water-soluble solvent includes water as a cosolvent.

25. The process of claim 17 wherein the water-wash zone comprises a continuous multi-stage counter-current contacting device, a multi-stage mixers/settler, or a rotating type contactor.

26. The process of claim 17 wherein the water-wash zone comprises a water tank serving as a decanter to separate less-polar hydrocarbons, heavy hydrocarbons and any sludge from the aqueous phase containing the water-soluble solvent and water.

27. The process of claim 17 wherein the feed comprises aromatic and non-aromatics and the EDC is operated under such conditions as to maximize benzene recovery in the first solvent-rich stream by keeping substantially all $C_9$ and heavier hydrocarbons in the first solvent-rich stream.

28. The process of claim 17 wherein the feed comprises aromatic and non-aromatics and the SRC is operated under such conditions as to strip only $C_8$ and lighter hydrocarbons from the first solvent-rich stream and to keep substantially all $C_9$ and heavier hydrocarbons in the second solvent-rich stream.

29. The process of claim 17 wherein the EDC is operated without a liquid reflux at the top of the column.

30. The process of claim 17 wherein in step (g) a thermal solvent regenerator is used to as an auxiliary unit for the water-wash zone for sludge removal.

* * * * *